US011263262B2

(12) United States Patent
Chen

(10) Patent No.: US 11,263,262 B2
(45) Date of Patent: **\*Mar. 1, 2022**

(54) INDEXING A DATASET BASED ON DATASET TAGS AND AN ONTOLOGY

(71) Applicant: Capital One Services, LLC, McLean, VA (US)

(72) Inventor: Kai-Wen Chen, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 216 days.

This patent is subject to a terminal disclaimer.

(21) Appl. No.: 16/654,661

(22) Filed: Oct. 16, 2019

(65) Prior Publication Data

US 2020/0409999 A1    Dec. 31, 2020

Related U.S. Application Data

(63) Continuation of application No. 16/457,706, filed on Jun. 28, 2019, now Pat. No. 10,489,454.

(51) Int. Cl.
*G06F 16/901* (2019.01)
*G06F 16/9038* (2019.01)
*G06F 16/36* (2019.01)

(52) U.S. Cl.
CPC .......... *G06F 16/901* (2019.01); *G06F 16/367* (2019.01); *G06F 16/9038* (2019.01)

(58) Field of Classification Search
CPC ... G06F 16/901; G06F 16/9038; G06F 16/367
See application file for complete search history.

(56) References Cited

U.S. PATENT DOCUMENTS

| 6,675,159 B1 | 1/2004 | Lin et al. |
| 6,810,405 B1 | 10/2004 | LaRue et al. |
| 7,093,200 B2 | 8/2006 | Schreiber et al. |

(Continued)

FOREIGN PATENT DOCUMENTS

| CN | 102087669 B | 1/2013 |
| CN | 104346130 A | 2/2015 |
| WO | 2011018245 A1 | 2/2011 |

OTHER PUBLICATIONS

Sriharee, G., "An ontology-based approach to auto-tagging articles", Vietnam J Comput Sci (2015), vol. 2, No. 2, pp. 85-94 https://doi.org/10.1007/s40595-014-0033-6.

(Continued)

*Primary Examiner* — Phuong Thao Cao
(74) *Attorney, Agent, or Firm* — Banner & Witcoff, Ltd.

(57) ABSTRACT

Aspects described herein may relate to methods, systems, and apparatuses that process one or more tags associated with a dataset and index the dataset based on the processing of the one or more tags. Processing a tag may include, for example, tokenizing the tag, mapping or expanding abbreviations included within the tag, and otherwise mapping or expanding elements of the tag based on alphanumeric characteristics. Additionally, as part of processing the tag, a number of potential tags may be determined. An ontology may be searched to determine whether any of the potential tags are also found within the ontology. The dataset may be indexed into a searchable index based on any of the potential tags that are found within the ontology.

20 Claims, 6 Drawing Sheets

(56) References Cited

U.S. PATENT DOCUMENTS

| | | | |
|---|---|---|---|
| 7,493,253 B1 | 2/2009 | Ceusters et al. | |
| 7,953,693 B2 | 5/2011 | Smith et al. | |
| 8,275,765 B2 | 9/2012 | Li et al. | |
| 8,429,179 B1* | 4/2013 | Mirhaji | G06F 16/248 |
| | | | 707/756 |
| 8,667,007 B2 | 3/2014 | Tao | |
| 8,782,051 B2 | 7/2014 | Chashchin et al. | |
| 9,135,348 B2 | 9/2015 | Wu et al. | |
| 9,684,683 B2 | 6/2017 | Dang et al. | |
| 10,261,990 B2 | 4/2019 | Chowdhury et al. | |
| 2002/0188599 A1 | 12/2002 | McGreevy | |
| 2005/0289124 A1* | 12/2005 | Kaiser | G06F 16/24522 |
| 2007/0005621 A1* | 1/2007 | Lesh | G16H 15/00 |
| 2007/0112714 A1 | 5/2007 | Fairweather | |
| 2007/0156669 A1* | 7/2007 | Marchisio | G06F 16/93 |
| 2009/0055732 A1 | 2/2009 | Motaparti et al. | |
| 2009/0112838 A1* | 4/2009 | Eggebraaten | G06F 16/367 |
| 2010/0312779 A1* | 12/2010 | Lim | G06N 5/022 |
| | | | 707/759 |
| 2011/0196851 A1 | 8/2011 | Vadlamani et al. | |
| 2011/0225163 A1 | 9/2011 | Lyon | |
| 2011/0302163 A1 | 12/2011 | Rhinelander et al. | |
| 2012/0078955 A1* | 3/2012 | Boguraev | G06F 40/134 |
| | | | 707/769 |
| 2012/0296895 A1* | 11/2012 | Robinson | G06F 16/313 |
| | | | 707/723 |
| 2013/0067333 A1 | 3/2013 | Brenneman | |
| 2013/0091138 A1 | 4/2013 | Liensberger et al. | |
| 2013/0132365 A1* | 5/2013 | Chang | G06Q 30/0241 |
| | | | 707/710 |
| 2013/0232134 A1 | 9/2013 | Haugen et al. | |
| 2013/0290317 A1 | 10/2013 | Spivack et al. | |
| 2014/0040275 A1* | 2/2014 | Dang | G06F 16/2228 |
| | | | 707/741 |
| 2014/0279622 A1 | 9/2014 | Lamoureux et al. | |
| 2014/0324808 A1 | 10/2014 | Sandhu et al. | |
| 2015/0026183 A1 | 1/2015 | Tonkin | |
| 2015/0142828 A1 | 5/2015 | Nguyen et al. | |
| 2015/0242387 A1 | 8/2015 | Rachevsky et al. | |
| 2015/0286718 A1* | 10/2015 | Wang | G06F 16/951 |
| | | | 707/738 |
| 2016/0004928 A1 | 1/2016 | Blanchflower et al. | |
| 2016/0162456 A1 | 6/2016 | Munro et al. | |
| 2016/0179775 A1* | 6/2016 | Desai | G06F 40/30 |
| | | | 715/230 |
| 2016/0179945 A1* | 6/2016 | Lastra Diaz | G06F 16/3334 |
| | | | 707/739 |
| 2016/0364419 A1 | 12/2016 | Stanton et al. | |
| 2017/0103072 A1 | 4/2017 | Yuen et al. | |
| 2017/0270188 A1 | 9/2017 | Jain et al. | |
| 2017/0286381 A1* | 10/2017 | Fink | G06F 3/0485 |
| 2017/0329842 A1 | 11/2017 | Ng Tari et al. | |
| 2018/0018960 A1 | 1/2018 | Anantaram et al. | |
| 2018/0046764 A1 | 2/2018 | Katwala et al. | |
| 2018/0330729 A1 | 11/2018 | Golipour et al. | |
| 2018/0365297 A1 | 12/2018 | Bhardwaj et al. | |
| 2019/0138806 A1 | 5/2019 | Banerjee et al. | |
| 2019/0258727 A1* | 8/2019 | Schmotzer | G06F 16/31 |
| 2020/0034479 A1* | 1/2020 | Winzenried | G06F 16/254 |

OTHER PUBLICATIONS

Lin H., Davis J., Zhou Y. (2009) An Integrated Approach to Extracting Ontological Structures from Folksonomies. In: Aroyo L. et al. (eds) The Semantic Web: Research and Applications. ESWC 2009. Lecture Notes in Computer Science, vol. 5554. Springer, Berlin, Heidelberg, pp. 654-668.

Pham M., Alse S., Knoblock C.A., Szekely P. (2016) Semantic Labeling: A Domain-Independent Approach. In: Groth P. et al. (eds) The Semantic Web—ISWC 2016. ISWC 2016. Lecture Notes in Computer Science, vol. 9981. Springer, Cham, 16 pages.

I. Katakis, G. Tsoumakas, I. Vlahavas, "Multilabel Text Classification for Automated Tag Suggestion", Proceedings of the ECML/PKDD 2008 Discovery Challenge, Antwerp, 2008. 9 pages.

Bada M., "Mapping of Biomedical Text to Concepts of Lexicons, Terminologies, and Ontologies", in: KumarV., Tipney (eds) Biomedical Literature Mining, Methods in Molecular Biology (Methods and Protocols), Humana Press, New York, NY, vol. 1159, 2014, pp. 33-45. (Year: 2014).

Corazza et al., "LINSEN: An Efficient Approach to Split Identifiers and Expand Abbreviations", in Proceedings of the 28th IEEE International Conference on Software Maintenance (ICSM), 2012, pp. 233-242. (Year: 2012).

Gao et al., "BIMTag: Concept-based Automatic Semantic Annotation of Online BIM Product Resources", Advanced Engineering Informatics, vol. 31, Jan. 2017, pp. 48-61. (Year: 2017).

Han et al., "Code Completion From Abbreviated Input", in Proceedings of the 2009 IEEE/ACM International Conference on Automated Software Engineering, 2009, pp. 332-343. (Year: 2009).

Han et al., "Code Completion of Multiple Keywords from Abbreviated Input", Automated Software Engineering, Sep. 2011, vol. 18, Issue 3/4, pp. 363-398. (Year: 2011).

Jaaniso E., "Automatic Mapping of Free Texts to Bioinformatics Ontology Terms", Master's Thesis (30 ECTS), University ofTartu, Institute of Computer Science, Computer Science Curriculum, 2016, 100 pages. (Year: 2016).

Shah et al., "Ontology-driven Indexing of Public Datasets for Translational Bioinformatics", BMC Bioinformatics, Feb. 2009, 10 ( Suppl 2):S1, 11 pages. (Year: 2009).

Sridhara et al., "Automatically Detecting and Describing High Level Actions Within Methods", in Proceedings of the 33rd International Conference on Software Engineering, Waikiki, Honolulu, HI, USA, May 21-28, 2011, pp. 101-110. (Year: 2011).

Stewart et al., "Comparing Metamap to MGrep as a Tool for Mapping Free Text to Formal Medical Lexicons", in Proceedings of the 1st International Workshop on Knowledge Extraction and Consolidation from Social-Media & the 11th International Semantic Web Conference (ISWC 2012), Nov. 12, 2012, pp. 63-77. (Year: 2012).

Delgoshaei, Parastoo, Mohammad Heidarinejad, and Mark A. Austin. "Combined ontology-driven and machine learning approach to monitoring of building energy consumption." In 2018 Building Performance Modeling Conference and SimBuild, Chicago, IL, pp. 667-674. 2018.

Doan, AnHai, Jayant Madhavan, Pedro Domingos, and Alon Halevy. "Ontology matching: A machine learning approach." In Handbook on ontologies, pp. 385-403. Springer, Berlin, Heidelberg, 2004.

Asim, Muhammad Nabeel, Muhammad Wasim, Muhammad Usman Ghani Khan, Waqar Mahmood, and Hafiza Mahnoor Abbasi. "A survey of ontology learning techniques and applications." Database 2018 (2018).

Asif, Muhammad, Hugo FMCM Martiniano, Astrid M. Vicente, and Francisco M. Couto. "Identifying disease genes using machine learning and gene functional similarities, assessed through Gene Ontology." PloS one 13, No. 12 (2018): e0208626.

Kastrati, Zenun, and Sule Yildirim Yayilgan. "Supervised Ontology-Based Document Classification Model." In Proceedings of the International Conference on Compute and Data Analysis, pp. 245-251. 2017.

Moser, Ben. "Introducing automatic data classification for Collibra Catalog." Blog posted Oct. 15, 2019. Webpage: Collibra. 9 pages. [Retreived Jun. 26, 2020 from https://www.collibra.com/blog/introducing-automatic-data-classification-for-collibra-catalog].

* cited by examiner

| | | | | 401 |
|---|---|---|---|---|
| Example Determination of a Plurality of Potential Ontology Tags | | | | |
| Example Window Size <u>405</u> | Example of Sliding Window Over An Expanded Tokenized Tag <u>410</u> | | | Example of Potential Ontology Tag <u>415</u> |
| 1 | Column | One | Name | Column |
|   | Column | One | Name | One |
|   | Column | One | Name | Name |
| 2 | Column | One | Name | Column One |
|   | Column | One | Name | One Name |
| 3 | Column | One | Name | Column One Name |

| Key | Included Based On Current Window Position | Not Included Based On Current Window Position | ~ 403 |
|---|---|---|---|

FIG. 4

INDEXING A DATASET BASED ON DATASET TAGS AND AN ONTOLOGY

CROSS-REFERENCE TO RELATED APPLICATIONS

The present application is a continuation of and claims priority to co-pending U.S. application Ser. No. 16/457,706, filed Jun. 28, 2019, and having the same title. The above-mentioned application is hereby incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

There are numerous challenges to ensuring datasets are tagged and indexed in such a way that the datasets can be easily found by a search. For example, two dataset sources may generate tags for the two datasets using two different tagging conventions. Based on the two different tagging conventions, the two datasets may include similar types of data, but the tags may be different from each other. If the two datasets are indexed based on the different tags, a search for the two datasets may result in only one of, or neither of, the two datasets being found by the search. In view of this result, allowing similar datasets to be indexed based on the different tags may decrease the utility of searchable indexes and may lessen the reliability of searches. Moreover, as the number of datasets and the number of dataset sources increase, searching for datasets may become increasingly unreliable. Indeed, as the number of datasets and the number of dataset sources increase, the potential for differences in the tags increases. An increase in the potential for differences in tags causes search results to be less reliable.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects described herein may address one or more inadequacies of dataset tagging, dataset indexing, and dataset searching techniques. Further, aspects described herein may address one or more other problems, and may generally improve reliability of systems that perform dataset tagging, dataset indexing and/or dataset searching.

For example, aspects described herein may relate to the processing of one or more tags associated with a dataset and indexing the dataset based on the processing of the one or more tags. Processing a tag may include, for example, tokenizing the tag, mapping or expanding abbreviations included within the tag, and otherwise mapping or expanding elements of the tag based on alphanumeric characteristics. Additionally, as part of processing the tag, a number of potential tags may be determined. An ontology may be searched to determine whether any of the potential tags are also found within the ontology. The dataset may be indexed into a searchable index based on any of the potential tags that are found within the ontology.

Additional aspects described herein may relate to implementing the processing and indexing mentioned above in an enterprise computing environment. For example, the processing of the one or more tags may be initiated based on a request to register a dataset with a metadata repository associated with an enterprise. After the processing of the one or more tags associated with the dataset is complete and the dataset has been indexed with the metadata repository, a computing device associated with the enterprise may be able to initiate a search that finds the dataset. This may allow for an enterprise to implement a standardized tag policy for datasets.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which:

FIG. 4 depicts an example of determining one or more potential ontology tags in accordance with one or more aspects described herein.

DETAILED DESCRIPTION

Figure 1:
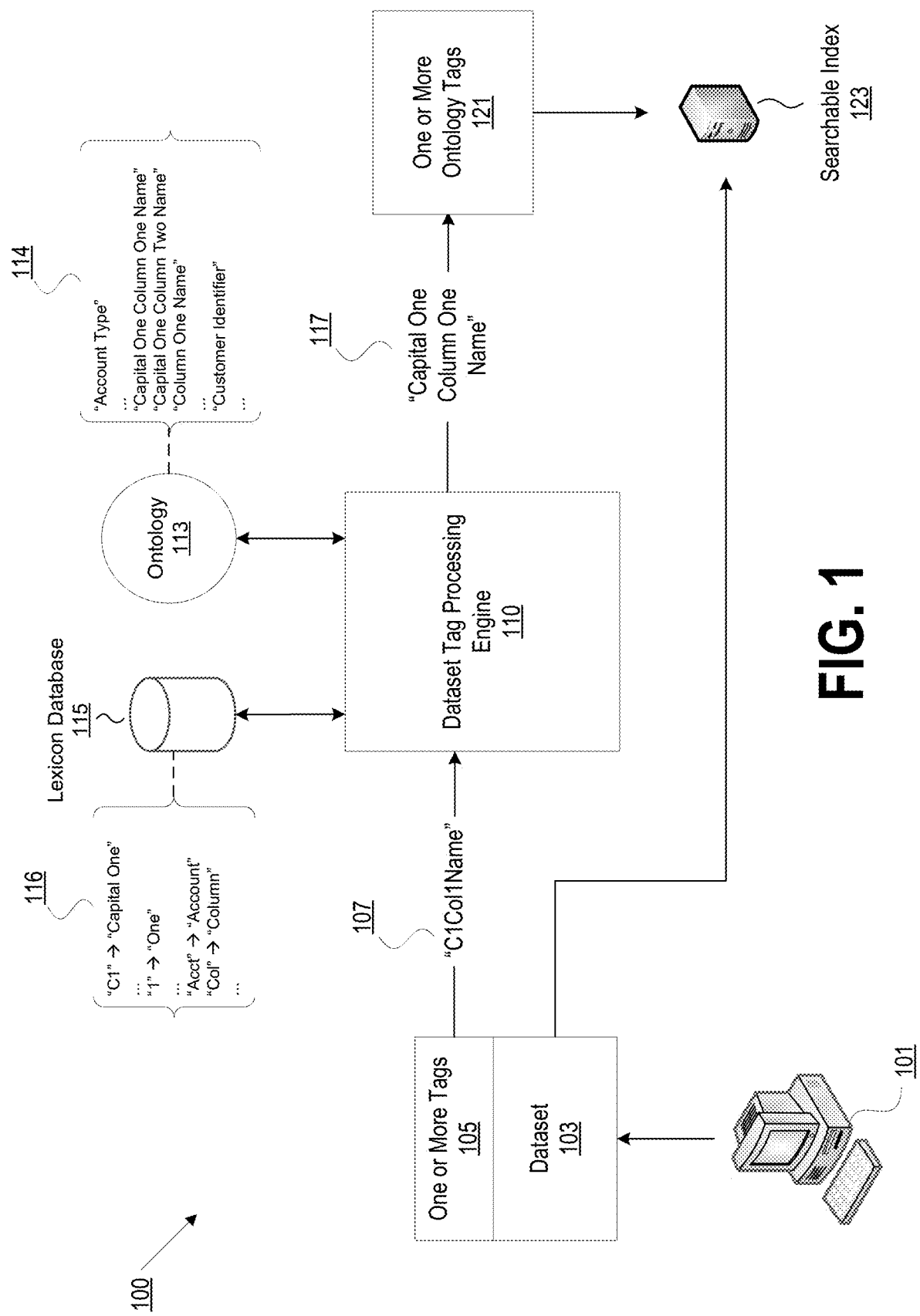
FIG. 1 depicts a block diagram of an example framework that, based on an ontology, indexes a dataset into a searchable index.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for indexing a dataset into a searchable database based on one or more tags and based on an ontology. Prior to indexing the dataset, any tag associated with the dataset may be processed based on an ontology. By processing a tag in accordance with aspects described herein, one or more tags that have been generated based on different tagging conventions may be converted into standardized tags as defined by the ontology. Throughout this disclosure, a tag will be referred to as including elements. An element of a tag may be any portion of a tag including, for example, an alphanumeric portion, a numeric portion, an alphabetic portion, and the like.] A tag element may be interchangeably used with an element of a tag.

Based on methods and techniques described herein, one or more tags may be processed to, for example, tokenize the tag, map or expand abbreviations included within the tag, and otherwise map or expand elements of the tag based on alphanumeric characteristics. As part of processing the tag, a number of potential tags may be determined. An ontology may be searched to determine whether any of the potential tags are also found within the ontology. The ontology may include standardized tags. The standardized tags may be organized within the ontology via relationships that interrelate the standardized tags to each other. A potential tag may be compared to one or more of the standardized tags of the ontology. For example, the comparison may determine if the potential tag matches one of the standardized tags. Matching a potential tag to one of the standardized tags is only one example of how potential tags may be compared to the standardized tags. Additional examples as to how potential tags may be compared to the standardized tags will be apparent by the discussion of this disclosure. The dataset may be indexed into a searchable index based on any of the potential tags that are found within the ontology. After indexing in this manner, the dataset may be searched using the standardized tags. For example, if a search is performed for a first standardized tag, the search results would include any dataset indexed based on a tag that matches, or is otherwise found based on, the first standardized tag. In this way, dataset indexing and dataset searching may be improved by, for example, making the results of searches more reliable. Additional examples of these aspects, and others, will be discussed below in connection with FIGS. 1-6.

FIG. 1 depicts a block diagram of an example framework that, based on an ontology, indexes a dataset into a searchable index. As a brief overview, the example framework 100 of FIG. 1 illustrates a process where a dataset 103 may be received from a dataset source, which is indicated by computing device 101. In some instances, the dataset 103 may be formatted in one or more columns or rows. Examples of datasets that may be formatted in one or more columns or rows includes tabular data and spreadsheet data. The dataset 103 may include various types of data including, for example, numeric data, textual data, image data, audio data, and the like. As one example, the dataset 103 may include particular types of data records such as, for example, customer record data, call log data, account information, chat log data, transaction data, and the like. The examples provided in connection with dataset 103 are only a few examples of the various formats, types of data, and types of data records for the dataset 103.

The dataset 103 may be associated with one or more tags 105. The one or more tags 105 may include one or more column names for the one or more columns, one or more row names for the one or more rows, and/or one or more items of metadata associated with the dataset 103. The one or more tags 105 may have been input by a user associated with the dataset source and/or generated based on tagging conventions specified in a policy or profile. Each of the one or more tags 105 may include alphanumeric elements with various characteristics including, for example, snake case (e.g., "snake_case"), camel case (e.g., "CamelCase"), numeric characters (e.g., "123456789"), alphabetic characters (e.g., "abcdefABCDEF"), punctuation characters (e.g., ",."), symbolic characters (e.g., "!@#S%&*"), and any other type of characters (e.g., emojis, other Unicode character, and the like), formatting characteristics (e.g., new line character, tab character, space character), and the like.

The one or more tags 105 may be processed by a dataset tag processing engine 110. The dataset tag processing engine 110 may process the one or more tags 105 based on, among other things, an ontology 113, and a lexicon database 115. Based on the processing of the one or more tags 105, the dataset tag processing engine 110 may determine one or more ontology tags 121. The dataset 103 may be indexed into the searchable index 123 based on the one or more ontology tags 121. One or more computing devices may be configured as the searchable index 123.

Framework 100 provides an example of the processing and indexing performed by the dataset tag processing engine 110, the ontology 113, and the lexicon database 115. In particular, the framework 100 provides an example based on a tag of "C1Col1Name", which is depicted in FIG. 1 as example tag 107. Tag 107 may be for one of the columns of dataset 103 (e.g., a column name of tabular or spreadsheet data included within dataset 103).

The dataset tag processing engine 110 may determine, based on the processing of tag 107, one or more ontology tags 121. For example, as depicted in FIG. 1, the dataset tag processing engine 110 may determine, based on the processing of tag 107, an ontology tag 117 of "Capital One Column One Name". To determine the example ontology tag 117, the tag 107 may be processed based on the ontology 113 and the lexicon database 115. The lexicon database 115 may include mapping information that indicate conversions for various abbreviations and alphanumeric elements. As depicted in FIG. 1, lexicon database 115 includes mapping information 116. Mapping information 116 includes, among other mappings, a mapping for converting an alphanumeric abbreviation element of "C1" to "Capital One"; a mapping for converting the numeric element of "1" to "One"; a mapping for converting an abbreviated character element of "Acct" to "Account"; and a mapping for converting an abbreviated character elements of "Col" to "Column" Various other example mappings will be apparent based on the examples discussed throughout this disclosure. Indeed, mappings may be configured for any anticipated tagging convention.

The different mappings may be separately stored in the lexicon database 115. For example, the mappings for alphanumeric abbreviation elements may be stored separately from the mappings for abbreviated character elements. In this way, the dataset tag processing engine 110 may be able to apply the mappings in a specific order (e.g., by applying the mappings for alphanumeric abbreviation elements before applying the mappings for abbreviated character elements).

The ontology 113 may include standardized tags that are interrelated to each other by various relationships. As depicted in FIG. 1, ontology 113 includes standardized tags 114. For clarity, the relationships between the standardized tags 114 are not shown in FIG. 1. Standardized tags 114 include, among others, a first standardized tag "Account Type"; a second standardized tag "Capital One Column One Name"; a third standardized tag "Capital One Column Two Name"; a fourth standardized tag "Column One Name"; and a fifth standardized tag "Customer Identifier". Various other example standardized tags will be apparent based on the examples discussed throughout this disclosure. Indeed, any number of standardized tags may be defined based on the types of datasets that are to be stored and/or indexed. The standardized tags 114 and/or the relationships of the ontology 113 may change over time. For example, the ontology 113 may be updated such that a relationship is added or removed from the ontology 113. The ontology 113 may be updated such that a standardized tag may be added and/or removed from the standardized tags 114.

In addition to the ontology 113 and the lexicon database 115, the dataset tag processing engine 110 may process the tag 107 based on alphanumeric characteristics for splitting tag elements and based on tag extraction windows that are configured to slide over elements of a tag. In this way, the one or more ontology tags 121 may be determined based on the tag 107, based on the lexicon database 115, based on the ontology 113, based on alphanumeric characteristics for splitting tag elements, and based on tag extraction windows that are configured to slide over elements of a tag. This processing may be performed by the dataset tag processing engine 110. Table I illustrates an example of the processing of tag 107.

Table I illustrates example tag data that is used and/or processed by the dataset tag processing engine 110 in connection with processing the tag 107. In particular, Table I indicates examples of tag data that are determined by the dataset tag processing engine 110 (e.g., the column "Example Tag data"). The examples of tag data indicate both the starting point of the processing (e.g., tag 107), various intermediate results that are determined by the dataset tag processing engine 110 (e.g., the first through fourth intermediate results), and the resulting one or more ontology tags (e.g., one or more ontology tags 121). Table I further indicates how the dataset tag processing engine 110 may determine the example tag data including, for example, whether the example tag data is determined based on the lexicon database 115, the ontology 113, alphanumeric characteristics for splitting tag elements, or tag extraction windows that are configured to slide over elements. Additionally, the rows of Table I are organized in accordance with an example order in which the dataset tag processing engine 110 can process the tag 107 (e.g., the first intermediate result can be determined based on the tag 107, the second intermediate result can be determined based on the first intermediate result, one or more ontology tags 121 can be determined based on the intermediate result of the previous row, etc.). Examples of Table I will be discussed throughout this disclosure as a way to illustrate examples of example methods and techniques described herein.

TABLE I

Example processing of tag 107

| Type of Tag Data | Example Tag Data | Determined Based On |
|---|---|---|
| Tag 107 | "C1Col1Name" | Determined based on an association with the dataset 103 |
| First intermediate result | "Capital OneCol1Name" | Determined based on applying alphanumeric abbreviation mappings of the lexicon database 115 (e.g., the mapping "C1" → "Capital One") to the tag 107. |
| Second intermediate result | "Capital", "One", "Col", "1", "Name" | Determined based on alphanumeric characteristics for splitting the first intermediate result into tokenized elements (e.g., splitting based on camel case and a transition between alphabetic and numeric characters) |
| Third intermediate result | "Capital", "One", "Column", "One", "Name" | Determined based on applying the abbreviation mappings of the lexicon database 115 (e.g., the mapping "1" → "One"; and the mapping "Col" → "Column") to the second intermediate result |
| Fourth intermediate result | "Capital", "One", "Column", "One", "Name", "Capital One", "One Column", "Column One", "One Name", "Capital One Column", "One Column One", "Column One Name", "Capital One Column One", "One Column One Name", "Capital One Column One Name" | Determined based on sliding tag extraction windows (e.g., tag extraction windows of size one, size two, size three, size four, and size five) over the third intermediate result. |
| One or more Ontology Tags 121 | "Capital One Column One Name" | Determined based on searching the ontology 113 (e.g., comparing the fourth intermediate result to one or more of the standardized tags and determining that "Capital One Column One Name" matches one of the standardized tags 114, and determining that "Column One Name" matches one of the standardized tags 114) |

In view of the example of Table I, the dataset tag processing engine 110 may process the tag 107 in a series of steps in certain example embodiments. Further details on the steps will be discussed below in connection with FIGS. 4 and 5. Also in view of the example of Table I, in certain example embodiments the dataset tag processing engine 110 may maintain the order of tag 107 through its series of ordered steps. This is illustrated by the intermediate results of Table I. For example, tag 107 ("C1Col1Name") is depicted in FIG. 1 as being arranged in an order of the element "C1", then the element "Col", then the element "1", and then the element "Name". In the example of Table I, the intermediate results and the one or more ontology tags 121 maintain this order (e.g., the expanded element "Capital" comes prior to the expanded element of "One", etc.). In other words, in the example shown, the elements of tag 107 are not rearranged by the processing of the dataset tag processing engine 110 (e.g., the expanded element "Capital" is never directly adjacent to the expanded element of "Column" or the element "Name").

Figure 2:
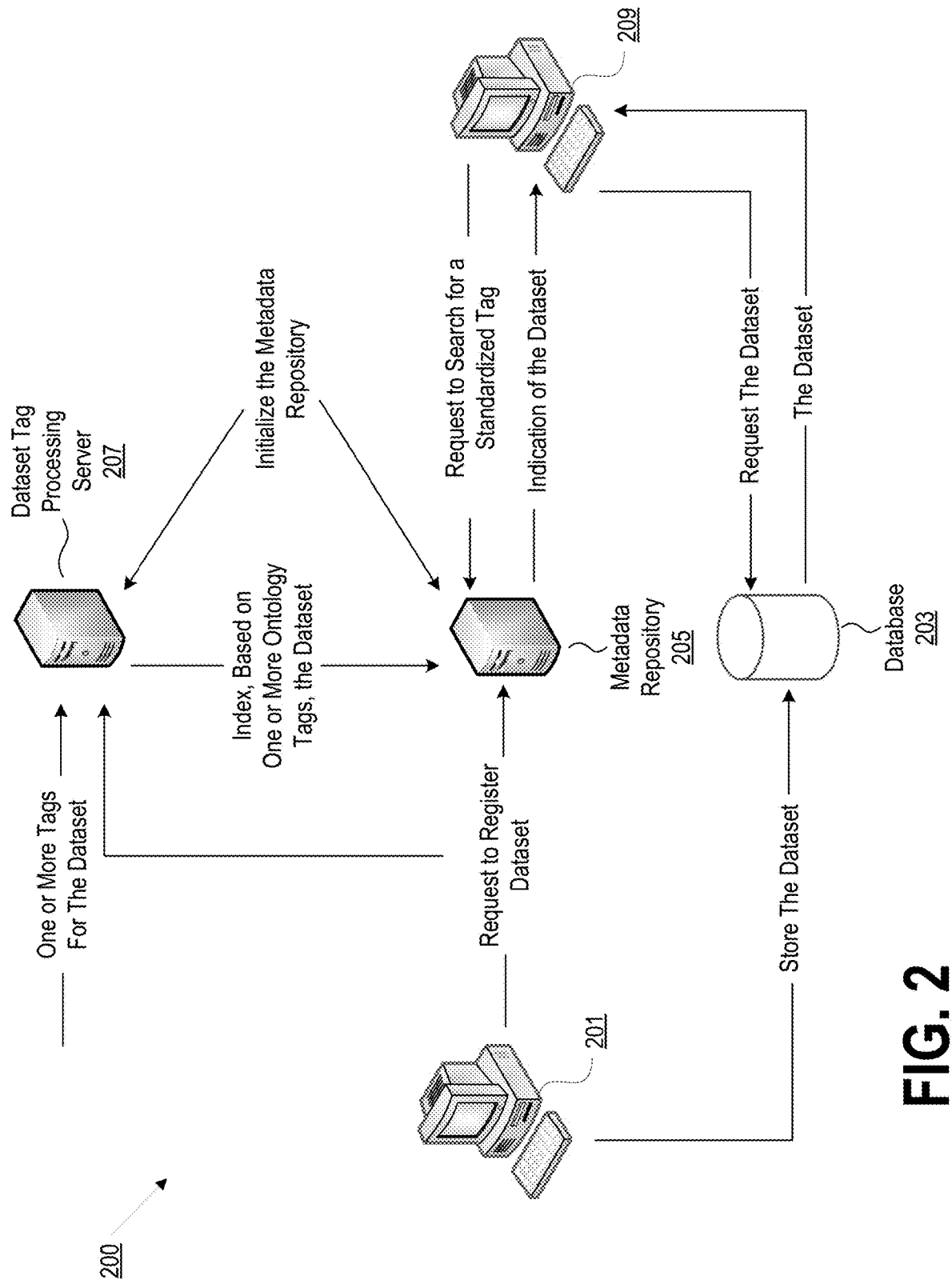
FIG. 2 depicts a block diagram of an enterprise computing environment that may be configured to index a dataset into a searchable index and perform a search for the dataset in accordance with one or more aspects described herein.

The example framework 100 of FIG. 1 could be used in a number of computing environments. One example computing environment is an enterprise computing environment that, among other things, stores and manages the datasets for an enterprise. The example framework 100 may be incorporated into an enterprise computing environment to index datasets and enable searches for the datasets. Further, the example framework 100 may be incorporated into an enterprise computing environment to allow for an enterprise to implement a standardized tag policy for datasets. FIG. 2 depicts a block diagram of an enterprise computing environment 200 that may be configured to index a dataset into a searchable index and perform a search for the dataset in accordance with one or more aspects described herein. The example enterprise computing environment 200 of FIG. 2 includes a dataset source, which is depicted as computing device 201; a database 203 configured to store datasets, which may be one of many databases for the enterprise; a metadata repository 205 configured to store metadata, and other information, that describes the datasets and/or the databases that store the datasets; a dataset tag processing server 207 that is configured to operate as the dataset tag processing engine 110 of FIG. 1; and a computing device 209, which may initiate a search of the datasets. At an arbitrary time, a dataset may be introduced to the enterprise computing environment 200. As depicted in FIG. 2, the dataset may be introduced based on the computing device 201 attempting to store the dataset in the database 203 and/or requesting to register the dataset with the metadata repository 205. The computing device 201 may be internal to the enterprise (e.g., a computing device being used by an employee of the enterprise and in communication with the database 203 and/or the metadata repository 205 via a VPN or a local intranet) or may be external to the enterprise (e.g., a computing device of a third-party entity that sends, via a public network, the dataset to the enterprise computing environment 200).

Based on the introduction of the dataset to the enterprise computing environment 200, the dataset tag processing server 207 may be configured to initiate processing of any tags associated with the dataset. Accordingly, as depicted in FIG. 2, the dataset tag processing server 207 may receive one or more tags (e.g., one or more tags 105 of FIG. 1) for the dataset (e.g., dataset 103 of FIG. 1). The one or more tags may be received via the computing device 201, received via the database 203, or extracted from the dataset itself.

As also depicted in FIG. 2, the dataset tag processing server 207 may be configured to initiate the processing based on the request to register the dataset. For example, the dataset tag processing server 207 may be configured to monitor for any requests to register being sent to the metadata repository and, if a request to register is identified, the dataset tag processing server 207 may begin processing the one or more tags. As another example, the metadata repository 205 may be configured with an initiation process that sends, to the dataset tag processing server 207, an indication of a request to register. The indication may cause the dataset tag processing server to begin processing the one or more tags. While the above two examples for initiating the processing of the one or more tags are in association with the metadata repository 205, similar monitoring and initiation processes may be configured in association with the database 203. Moreover, there are alternative ways in which the dataset tag processing server 207 may initiate the processing of the one or more tags. For example, the computing device 201 may send the dataset to the dataset tag processing server 207 and, based on receipt of the dataset, the dataset tag processing server 207 may initiate the processing of the one or more tags.

After initiating the processing of the one or more tags, the dataset tag processing server 207 may perform the processing of the one or more tags. This may be performed similar to the discussion of the dataset tag processing engine 110 of FIG. 1. In particular, the dataset tag processing server 207 may process the one or more tags based on a lexicon database (e.g., lexicon database 115), an ontology (e.g., the ontology 113), alphanumeric characteristics for splitting elements of a tag into tokens, and/or tag extraction windows that are configured to slide over elements of a tag. The dataset tag processing server 207 may be configured to store the ontology and/or the lexicon database, or the dataset tag processing server 207 may have access to the ontology and/or the lexicon database.

Based on processing the one or more tags, the dataset tag processing server 207 may determine one or more ontology tags (e.g., one or more ontology tags 121 of FIG. 1) for the dataset. Based on the one or more ontology tags, the dataset tag processing server 207 may be configured to cause the dataset to be indexed based on the one or more ontology tags. As depicted in FIG. 2, metadata repository 205 is configured as a searchable index (e.g., searchable index 123 of FIG. 1). Accordingly, the dataset tag processing server 207 may communicate with the metadata repository 205 to index the dataset based on the one or more ontology tags. By indexing in this manner, the enterprise may be able to index datasets based on standardized tags (e.g., standardized tags 114 of FIG. 1) that are defined by the ontology. Indexing the dataset may include, for example, storing an association between the dataset and the one or more ontology tags so that if a search is performed based on an ontology tag, an indication of the dataset can be included in the results of the search. The indication of the dataset may indicate a storage location of the dataset (e.g., the indication of the dataset may include a resource link, or other identifier, to a location where the dataset is stored on the database 203). Accordingly, the association may include the storage location of the data set.

After the dataset has been indexed based on the one or more ontology tags, users or other devices associated with the enterprise computing environment 200, based on a search, may be able to locate and/or access the dataset. For example, computing device 209 may be configured to initiate a search of the metadata repository 205. As depicted in FIG. 2, the computing device 209 may be configured to initiate a search by sending a request to search for a particular standardized dataset tag. The particular standardized dataset tag may be one of the standardized tags (standardized tags 114 of FIG. 1) defined by the ontology. The particular standardized dataset tag may be used by a search to find an ontology tag that formed the basis for indexing the dataset. For example, the searching may determine that the particular standardized dataset tag matches the ontology tag that formed the basis for indexing the dataset. Accordingly, when performing the search, the metadata repository 205 may be configured to determine, based on the particular standardized dataset tag and the searchable index of the metadata repository 205, at least one of the ontology tags (e.g., ontology tags 121 of FIG. 1), and include an indication of the dataset as part of the search results. As depicted in FIG. 2, the metadata repository 205, based on performing the search, may be configured to send, to the computing device 209, an indication of the dataset as part of the search results. The indication may include the storage location of the dataset. Upon receiving the indication of the dataset, the computing device 209 may be configured to display the indication of the dataset. A user may select the indication and, based on the selection, the computing device 209 may be configured to send, to the database 203, a request for the dataset. Based on the request, the database 203 may be configured to send, to the computing device 209, the dataset. Upon receipt of the dataset, the computing device 209 may be configured to display the dataset. The requesting and/or displaying of the dataset are examples of the actions that can be performed based on a search. Other actions may be performed. For example, the results of the search may be subject to one or more actions associated with the particular standardized tag (e.g., encrypting any dataset found by the search; generating a report indicating any dataset, and dataset sources, found by the search). The actions may be automatically by a computing device upon receiving the results of the search.

As also depicted in FIG. 2, the metadata repository 205 may be initialized. For example, the metadata repository 205 may include a pre-existing index of searchable tags. Each of the searchable tags may be processed by the dataset tag processing server 207 to determine, for each tag, one or more initialized ontology tags. Each tag may be replaced in the pre-existing index by the one or more initialized ontology tags. In this way, the pre-existing index may be converted to be searched based on the standardized tags of the ontology. Because the standardized tags and/or the relationships of the ontology may change over time (e.g., a relationship and/or a standardized tag may be added and/or removed from the ontology), this initialization process may be performed on a periodic schedule, on-demand schedule, or based on an update to the ontology, to update the metadata repository based on the ontology.

Figure 3:
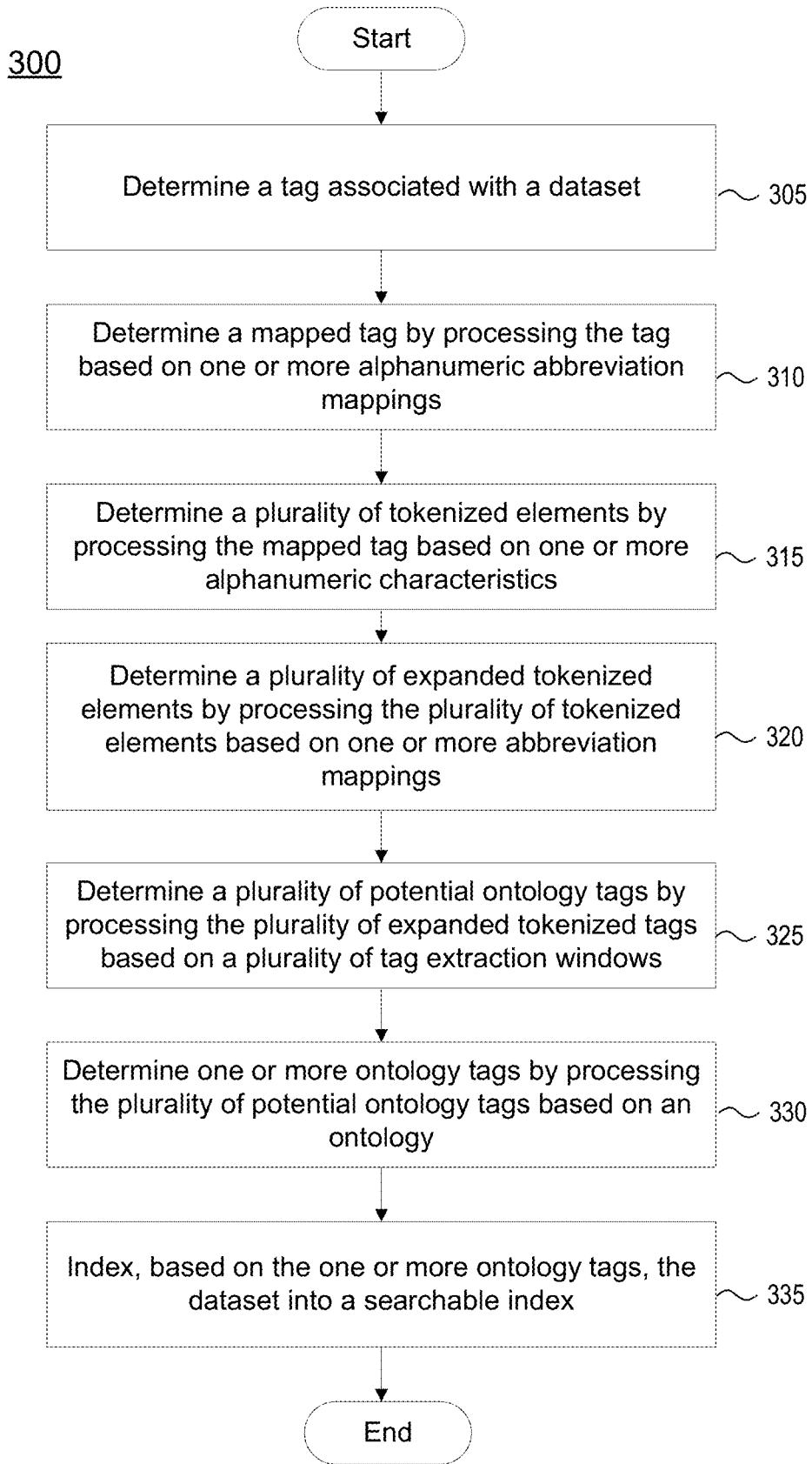
FIG. 3 depicts an example method that may, based on an ontology, index a dataset into a searchable index.
Figure 5:
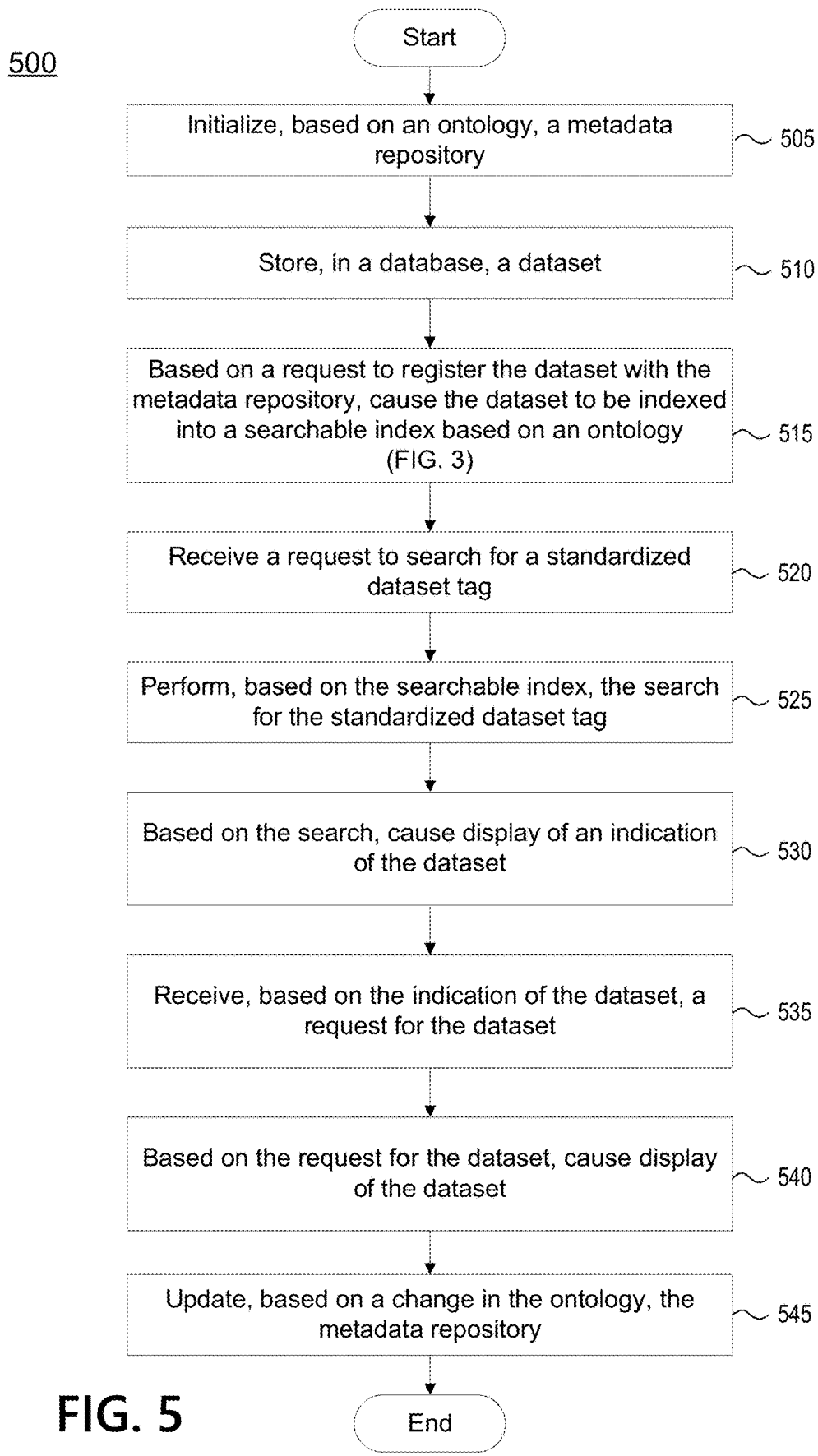
FIG. 5 depicts an example method that may index a dataset into a searchable index and perform a search for the dataset in accordance with one or more aspects described herein.

Having discussed the example framework 100 of FIG. 1 and the example enterprise computing environment 200 of FIG. 2, example methods that may be performed by one or more computing devices based on the example framework 100 and/or as part of the example enterprise computing environment 200 will be discussed. The example methods are depicted at FIGS. 3 and 5. FIG. 4 provides an illustrative example for one of the steps discussed in connection with FIG. 3.

FIG. 3 depicts an example method 300 that may, based on an ontology, index a dataset into a searchable index. Method 300 may be implemented by one or more suitable computing devices, as described herein. For example, method 300 may be implemented by a computing device (e.g., dataset tag processing server 207; and/or any one of computing devices 601, 605, 607, and 609 of FIG. 6), and/or combination of computing devices (e.g., a combination of dataset tag processing server 207 and any other device of the enterprise computing environment 200; and/or a combination of computing devices 601, 605, 607, and 609 of FIG. 6). Method 300 may be implemented in suitable computer-executable instructions, such as in dataset processing software 627. Method 300 may also include access of an ontology and/or a lexicon database, such as ontology 113 and lexicon database 115 of FIG. 1. The ontology and lexicon database may be stored as lexicon and ontology data 629 of FIG. 6 or as part of some other database.

At step 305, the one or more computing devices may determine a tag associated with a dataset. This determination may be based on the one or more computing devices receiving the dataset, receiving one or more tags for the dataset, receiving an indication to initiate processing of one or more tags for the dataset, or receiving some other indication that the tag is associated with the dataset. This determination may include retrieving the tag from a dataset source that stores the dataset and/or extracting the tag from the dataset itself.

After determining the tag, the one or more computing devices may proceed to process the tag. Steps 310-330 represent an ordered series of steps that is performed as part of the processing of the tag. The processing performed by steps 310-330 is similar to the examples discussed in connection with the dataset tag processing engine 110 of FIG. 1 and Table I. Additionally, and similar to the examples discussed in connection with FIG. 1 and Table I, the one or more computing devices may, as part of the processing of the tag, maintain the order of the tag's elements.

At step 310, the one or more computing devices may determine a mapped tag by processing the tag based on one or more alphanumeric abbreviation mappings. The one or more alphanumeric abbreviation mappings may include one or more mappings for abbreviations that include alphabetic and numeric characters (e.g., the mapping "C1"→"Capital One" as included in mapping information 116 of FIG. 1). This determination may result in a mapped tag that, as compared to the tag, includes an expansion of one or more alphanumeric elements of the tag. For example, if the tag includes "C1Col1Name" (e.g., tag 107 of FIG. 1), this determination may result in a mapped tag equivalent to the first intermediate result of Table I. With respect to the example of Table I, the element "C1" of the tag has been expanded to the element "Capital One", which results in a mapped tag that includes "Capital OneCol1Name".

At step 315, the one or more computing devices may determine a plurality of tokenized elements by processing the mapped tag based on one or more alphanumeric characteristics. The one or more alphanumeric characteristics may be for splitting tag elements. Examples of alphanumeric characteristics that may be for splitting tag elements include snake case (e.g., "snake_case"), camel case (e.g., "CamelCase"), a transition between alphabetic and numeric characters (e.g., "B1" or "1C"), a punctuation character (e.g., a period character, a comma character), a symbolic character (e.g., any one of "!@#S%&*"), and a formatting characteristic (e.g., new line character, tab character, space character). This determination may result in a plurality of tokenized elements that, as compared to the mapped tag, separate the elements of the mapped tag from each other if one of the alphanumeric characteristics occurs in the mapped tag. For example, continuing with the example of step 310, this determination may result in a plurality of tokenized elements equivalent to the second intermediate result of Table I (e.g., a plurality of tokenized elements that includes "Capital", "One", "Col", "1", and "Name"). With respect to the example of Table I, the mapped tag that includes "Capital OneCol1Name" has been split based on occurrences of camel case and transitions between alphabetic and numeric characters.

At step 320, the one or more computing devices may determine a plurality of expanded tokenized elements by processing the plurality of tokenized elements based on one or more abbreviation mappings. The one or more abbreviation mappings may include one or more mappings for abbreviations that include alphabetic or numeric characters (e.g., the mapping of "Col"→"Column" and the mapping "1"→"One", as included in mapping information 116 of FIG. 1). This determination may result in plurality of expanded tokenized elements that, as compared to the plurality of tokenized elements, includes an expansion of one or more abbreviated elements of the plurality of tokenized elements. For example, continuing the example of step 315, this determination may result in a plurality of expanded tokenized elements equivalent to the third intermediate result of Table I (e.g., a plurality of expanded tokenized elements that includes "Capital", "One", "Column", "One", and "Name"). With respect to the example of Table I, the element "Col" of the plurality of expanded tokenized elements has been expanded to the element "Column", and the element "1" of the plurality of expanded tokenized elements has been expanded to the element "One".

At step 325, the one or more computing devices may determine a plurality of potential ontology tags by processing the plurality of expanded tokenized elements based on a plurality of tag extraction windows. This determination may be performed based on sliding a plurality of tag extraction windows over the plurality of expanded tokenized elements. Each of the plurality of tag extraction windows may have a window size that is different from each other tag extraction window. For example, the window size may be in units of elements (e.g., a window size of 1 would include a single tokenized element), and the tag extraction windows may include windows of sizes 1 up to the number of elements in the plurality of expanded tokenized elements. Continuing the example of step 320, the tag extraction windows may include windows of size 1, 2, 3, 4, and 5, based on the plurality of expanded tokenized elements including five elements (e.g., elements "Capital", "One", "Column", "One", and "Name"). This determination may result, for example, in a plurality of potential ontology tags that includes the fourth intermediate result of Table I, plus additional potential ontology tags for the tag extraction windows of size 1, 3, and 5.

FIG. 4 provides an additional example 401 of determining a plurality of potential ontology tags. In particular, as depicted at column 410 of FIG. 4, three different tag extraction windows are slid across tokenized elements of "Column", "One", and "Name". The current position of the tag extraction window is shown by an element having a black background with white text. As depicted at column 405 of FIG. 4, the three different tag extraction windows have sizes of 1, 2, and 3. As depicted at column 415 of FIG. 4, the sliding of the three different tag extraction windows results in six different potential ontology tags. Only elements included based on the window's current position are included as a potential ontology tag. Sliding the first tag extraction window of size 1 results in potential ontology tags of "Column", "One", and "Name". Sliding the second tag extraction window of size 2 results in potential ontology tags of "Column One" and "Name One". Sliding the third tag extraction window of size 3 results in a potential ontology tag of "Column One Name". Further, as illustrated, by sliding the window in this manner, the potential ontology tags maintain the order of the elements. In other words, the elements are not rearranged by the sliding of the tag extraction windows (e.g., the element "Column" is never directly adjacent to the element of "Name" in a potential ontology tag).

Continuing at step 330 of FIG. 3, the one or more computing devices may determine one or more ontology tags by processing the plurality of potential ontology tags based on an ontology. As discussed above, the ontology may include standardized tags (e.g., standardized tags 114 of FIG. 1) and relationships that interrelate the standardized tags to each other. Processing the plurality of potential ontology tags based on the ontology may be performed by searching the ontology and comparing the plurality of potential ontology tags to the standardized tags of the ontology. Based on the comparison, the one or more ontology tags may be determined. For example, the comparison may be used to determine any matches to the plurality of potential ontology tags. If a match is determined, the matching tag is included in the one or more ontology tags. In this way, only potential ontology tags that match a standardized tag may be included as one of the ontology tags. Continuing the example of step 325, the plurality of potential ontology tags may include a potential ontology tag of "Capital One Column One Name", and the one or more ontology tags would include a tag of "Capital One Column One Name" based on a search of ontology 113 (e.g., the comparison is used to determine that the potential ontology tag matches one of the standardized tags 114).

Matches between the plurality of potential ontology tags and the standardized tags may be a complete match. For example, a match may be determined if a potential ontology tag exactly matches a standardized tag (e.g., a potential tag of "Capital One" would match a standardized tag of "Capital One", and would not match a standardized tag of "Column One"). The matches between the plurality of potential ontology tags and the standardized tags may be based on a threshold match. The threshold match may be based on comparing the elements of the potential ontology tag and the elements of the standardized tag. For example, a match may be determined if there are a number of matching elements that is above a threshold (e.g., a potential tag of "Capital One" would result in a 50% match of a standardized tag of "Column One", and "Column One" would be included in the one or more ontology tags if the 50% match is greater than the threshold).

The matching may be performed based on a filtering process. For example, the standardized tags may be filtered based on the size of a potential ontology tag or an element of the potential ontology tag. For example, for filtering based on the size of a potential ontology tag, the potential ontology tag may be compared to standardized tags that have an equal size (e.g., a potential ontology tag "Column One Name" has a size of three and, based on filtering by size, the potential ontology tag will be compared to standardized tags that also have a size of three). As another example, for filtering based on an element of a potential ontology tag, the potential ontology tag may be compared to standardized tags that have a matching first element (e.g., a potential ontology tag "Column One Name", based on filtering by element, will be compared to standardized tags that also begin with the element "Column").

Further, the one or more ontology tags may be determined based on one or more relationships of the ontology. For example, a first standardized tag may be found within the ontology based on a comparison of the first standardized tag and a potential ontology tag. The ontology may include a relationship that interrelates the first standardized tag to a second standardized tag. Based on the relationship, the second standardized tag may be included in the one or more ontology tags. As one particular example, the first standardized tag may for financial records of the enterprise. The second standardized tag may indicate a category for the first standardized tag (e.g., the second standardized tag may for private, confidential, or sensitive pieces of data). Based on the second standardized tag and based on the relationship, the ontology indicates that financial records of the enterprise are private, confidential, or sensitive pieces of data. By including the second standardized tag in the one or more ontology tags, the dataset may be indexed based on the category and searches for particular categories may be performed. For example, the enterprise may have established additional processes that apply data security protocols to any data indexed based on the second standardized tag.

Additionally, fuzzy matching techniques may be used when determining the one or more ontology tags. A potential ontology tag may be included in the one or more ontology tags is the fuzzy matching technique determines a match. By using fuzzy matching, the determination of the one or more ontology tags may be more resilient to typos, or other errors, in the tag that are not anticipated by the lexicon database.

At step 335, the one or more computing devices may index, based on the one or more ontology tags, the dataset into a searchable index. Indexing may include, for example, storing an association between the dataset and the one or more ontology tags. Based on the association and if a search is performed based on an ontology tag, an indication of the dataset can be included in the results of the search. The indication of the dataset may indicate a storage location of the dataset (e.g., the indication of the dataset may include a resource link, or other identifier, to a location where the dataset is stored on the database 203). Accordingly, the association may include the storage location of the data set. Continuing the example of step 330, indexing the dataset may include storing an association between the dataset and the ontology tag of "Capital One Column One Name". In this way, if a search is performed for the tag "Capital One Column One Name", an indication of the dataset may be included in the results.

The above discussion of FIG. 3 provides one example of the methods that may be performed to index a dataset based on a dataset tag and an ontology. Variations on the example method include changing the order of the steps of method 300, removing one or more of the steps of method 300, and adding one or more steps to the method 300. As one example, step 310 may be removed. Instead of performing step 310, the method may proceed from step 305 to step 315, and the plurality of tokenized elements may be determined based on the tag instead of the mapped tag.

Steps 325-330 of FIG. 3 and the example of FIG. 4 provide an example of how ontology tags may be determined based on an ontology. Other processes may be used to determine the ontology tags. For example, instead of tag extraction windows and searching the ontology, the expanded tokenized tags may be searched. As one example, each of the standardized tags of the ontology may be used as a basis for searching the expanded tokenized tags. This search may be performed by sliding a current standardized tag over the expanded tokenized tags. Sliding the current standardized tag may be performed similarly to the sliding of the tag extraction windows of FIG. 4. However, instead of extracting potential tags based on a current position of a tag extraction window, the current position of the current standardized tag may be used as a basis for comparing the current standardized tag to a portion of the expanded tokenized tags. Based on the comparison, if a match to the current standardized tag is found, the current standardized tag may be included in the one or more ontology tags. If a match is not found, the current standardized tag may continue to slide to a next position. If the end of the expanded tokenized tag is reached, the next standardized tag may be slid over the expanded tokenized tag. Moreover, this alternative example of determining ontology tags may be combined with steps 325-330 of FIG. 3. For example, if the expanded tokenized tags have a number of elements greater than and, optionally, equal to a threshold (e.g., greater than 50 elements), then this alternative example of determining ontology tags may be performed. If the expanded tokenized tags have a number of elements less than and, optionally, equal to the threshold (e.g., less or equal to 50 elements), then steps 325 and 330 may be performed.

Additionally, steps of 310-330, which represent the ordered steps performed by the one or more computing devices to process the tag, may be ordered based on one or more tagging conventions. One tagging convention discussed throughout this disclosure is the usage of the abbreviation "C1" for "Capital One". Continuing the examples discussed in connection with steps 310-330, step 310 may be performed prior to step 315 so that certain alphanumeric abbreviations, including the abbreviation "C1", are expanded prior to the determination of the tokenized elements. If the order was reversed, the resulting plurality of potential ontology tags may be different from the example discussed in connection with step 325. For example, with respect to the abbreviation "C1", if steps 310 and 315 were reversed, the abbreviation "C1" would be split into two elements prior to the expansion to "Capital One". If a mapping of "C"→"Capital" does not exist, the processing performed by the reverse order of steps 310 and 315 would not expand the "C" into "Capital", and the resulting potential ontology tags would not include any instance of "Capital".

FIG. 5 depicts an example method 500 that may index a dataset into a searchable index and perform a search for the dataset. Method 500 may be implemented by one or more suitable computing devices, as described herein. As an example, method 500 may be implemented by one or more computing devices of an enterprise computing environment, such as the example enterprise computing environment 200 of FIG. 2. Method 500 may also include performance of a method that is the same as or similar to the method 300 of FIG. 3. Accordingly, the one or more computing devices that implement method 500 may be any of the one or more computing devices that implement method 300.

At step 505, the one or more computing devices may initialize, based on an ontology, a metadata repository. Initializing the metadata repository may include, for example, processing or replacing, based on the ontology, any tag stored in a searchable index of the metadata repository. Once initialization is complete, the metadata repository may include a searchable index based on the standardized tags of the ontology. The initializing may be performed similar to the processing of FIG. 3. For example, each tag stored in the searchable index may be processed by performing steps 310-330 of FIG. 3, and upon completing the processing of each tag, each tag may be replaced with the results of the processing (e.g., the one or more ontology tags determined based on each tag at step 330 of FIG. 3). In this way, the metadata repository may be initialized by converting the searchable index to be searched based on the standardized tags of the ontology.

At step 510, the one or more computing devices may store, in a database, a dataset. The database (e.g., database 203 of FIG. 2) may be one of many databases for the enterprise. Further, the dataset may be stored in a database that is configured to store the type of data included by the dataset. For example, if the dataset includes call record data, the dataset may be stored in a database that is configured to store call records for the enterprise. If the dataset includes account information, the dataset may be stored in a database that is configured to store account information.

At step 515, the one or more computing devices may, based on a request to register the dataset with the metadata repository, cause the dataset to be indexed into a searchable index based on an ontology. The request to register the dataset may be sent by a dataset source (e.g., computing device 201 of FIG. 2) and a monitoring process or an initiation process (e.g., as discussed above in connection with the dataset tag processing server 207 and the metadata repository 205) may, based on the request, cause the dataset to be indexed into a searchable index based on an ontology. Causing the dataset to be indexed into a searchable index based on the ontology may cause the one or more computing devices to process one or more tags associated with the dataset. Accordingly, method 300 of FIG. 3 may be performed for each of the one or more tags associated with the dataset. As discussed in connection with FIG. 3, the processing of a tag may be performed by, among other things, determining one or more ontology tags (e.g., one or more ontology tags 121 of FIG. 1) for the dataset and indexing the dataset based on the one or more ontology tags. In some instances, the searchable index may be configured as part of the metadata repository.

At step 520, the one or more computing devices may receive a request to search for a standardized dataset tag. For example, a computing device (e.g., computing device 209 of FIG. 2) associated with the enterprise may initiate a search by sending a request that identifies a particular standardized tag of the ontology (e.g., "Capital One Column One Name").

At step 525, the one or more computing devices may perform, based on the searchable index, a search may be performed for the standardized dataset tag. The search may look for any datasets indexed based on an ontology tag that matches, or may otherwise be found based on, the particular standardized tag. Continuing the example of step 515, the results of the search may include an indication of any dataset indexed based on an ontology tag that matches, or is otherwise found based on, "Capital One Column One Name".

At step 530, the one or more computing devices may, based on the search, cause display of an indication of the dataset. This may include sending the indication of the dataset to the computing device that requested the search (e.g., computing device 209 of FIG. 2). Upon receipt of the indication, the computing device may display the indication of the dataset. The indication of the dataset may include a storage location of the dataset.

At step 535, the one or more computing devices may receive, based on the indication of the dataset, a request for the dataset. For example, a user may, based on the display caused in connection with step 525, select the dataset and, based on the selection, the request for the data set may be sent to a database that stores the dataset (e.g., database 203 of FIG. 2).

At step 540, the one or more computing devices may, based on the request for the dataset, cause display of the dataset. This may include sending the dataset to the computing device that requested the dataset (e.g., computing device 209 of FIG. 2). Upon receipt of the dataset, the computing device may display the indication of the dataset (e.g., display the dataset in a tabular or spreadsheet format).

In addition to requesting and/or displaying the dataset, additional or alternative actions may be performed. For example, the standardized tag that formed the basis for the search performed at step 525 may be for a particular category of data (e.g., the standardized tag may be for private, confidential, or sensitive pieces of data). The results of the search may be subject to one or more additional computing actions associated with the particular category (e.g., applying data security protocols to the resulting datasets such as data encryption protocols; generating a report indicating the resulting datasets and/or the dataset sources of the resulting datasets).

At step 545, the one or more computing devices may update, based on a change in the ontology, the metadata repository. The standardized tags and/or the relationships of the ontology may change over time (e.g., a relationship and/or a standardized tag may be added and/or removed from the ontology). Accordingly, based on a periodic schedule, an on-demand schedule, or a determination that an update to the ontology occurred, the metadata repository may be updated based on the ontology. The update may be performed similar to the processing of FIG. 3. For example, each tag stored in the searchable index may be processed by performing steps 310-330 of FIG. 3, and upon completing the processing of each tag, each tag may be replaced with the results of the processing (e.g., the one or more ontology tags determined based on each tag at step 330 of FIG. 3). In this way, the metadata repository may be updated based on a change in the ontology.

Figure 6:
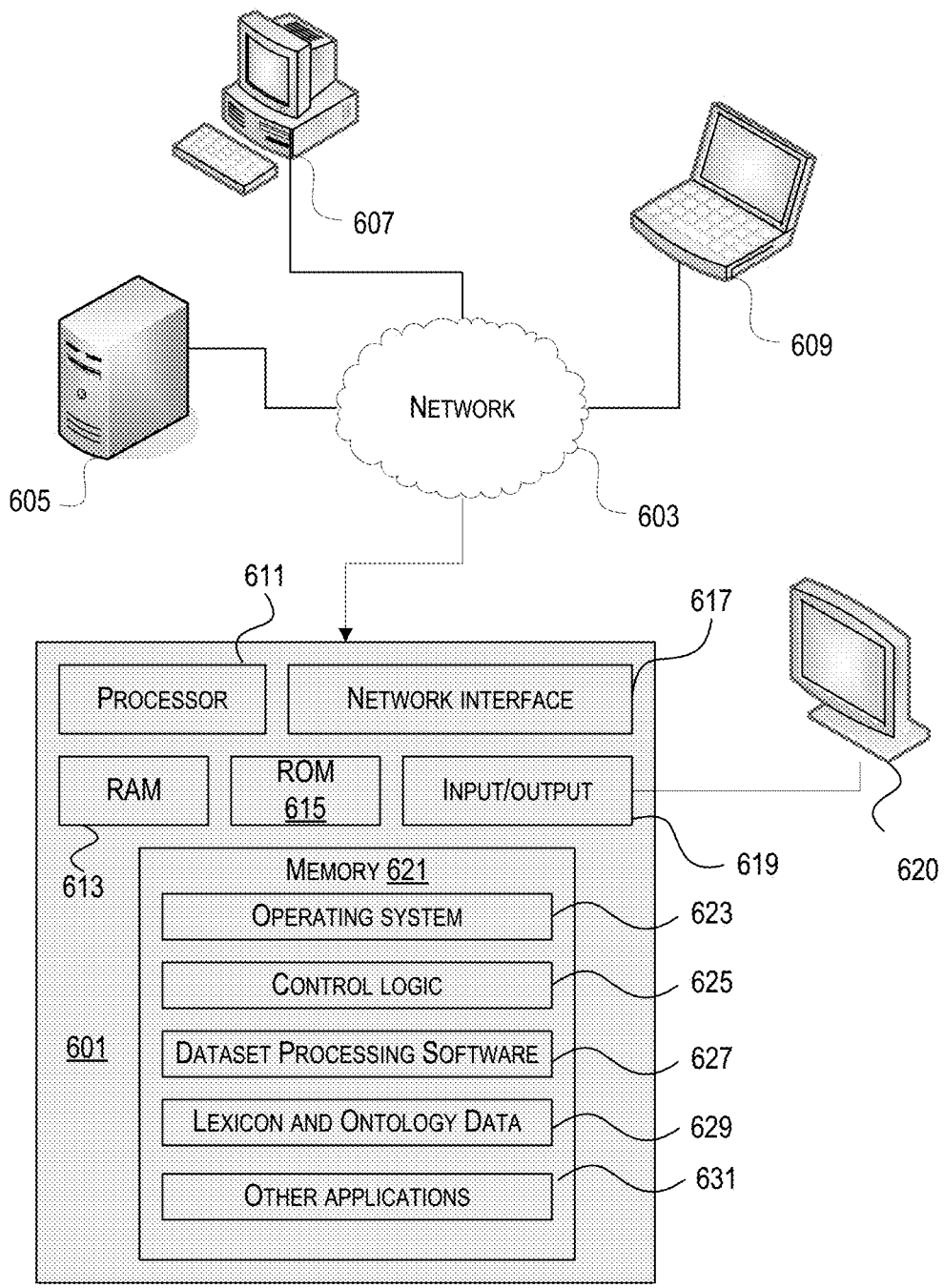
FIG. 6 depicts an example of a computing device that may be used in implementing one or more aspects described herein.

FIG. 6 illustrates one example of a computing device 601 that may be used to implement one or more illustrative aspects discussed herein. For example, computing device 601 may, in some embodiments, implement one or more aspects of the disclosure by reading and/or executing instructions and performing one or more actions based on the instructions. Computing device 601 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 601 may, in some embodiments, operate in a standalone environment. In others, computing device 601 may operate in a networked environment. As shown in FIG. 6, various network nodes 601, 605, 607, and 609 may be interconnected via a network 603, such as the Internet. Other networks may also or alternatively be used, including private intranets, corporate networks, LANs, wireless networks, personal networks (PAN), and the like. Network 603 is for illustration purposes and may be replaced with fewer or additional computer networks. A local area network (LAN) may have one or more of any known LAN topology and may use one or more of a variety of different protocols, such as Ethernet. Devices 601, 605, 607, 609 and other devices (not shown) may be connected to one or more of the networks via twisted pair wires, coaxial cable, fiber optics, radio waves or other communication media.

As seen in FIG. 6, computing device 601 may include a processor 611, RAM 613, ROM 615, network interface 617, input/output interfaces 619 (e.g., keyboard, mouse, display, printer, etc.), and memory 621. Processor 611 may include one or more computer processing units (CPUs), graphical processing units (GPUs), and/or other processing units such as a processor adapted to perform computations associated with speech processing or other forms of machine learning. I/O 619 may include a variety of interface units and drives for reading, writing, displaying, and/or printing data or files. I/O 619 may be coupled with a display such as display 620. Memory 621 may store software for configuring computing device 601 into a special purpose computing device in order to perform one or more of the various functions discussed herein. Memory 621 may store operating system software 623 for controlling overall operation of computing device 601, control logic 625 for instructing computing device 601 to perform aspects discussed herein, dataset processing software 627, lexicon and ontology data 629, and other applications 629. Control logic 625 may be incorporated in and may be a part of dataset processing software 627. In other embodiments, computing device 601 may include two or more of any and/or all of these components (e.g., two or more processors, two or more memories, etc.) and/or other components and/or subsystems not illustrated here.

Devices 605, 607, 609 may have similar or different architecture as described with respect to computing device 601. Those of skill in the art will appreciate that the functionality of computing device 601 (or device 605, 607, 609) as described herein may be spread across multiple data processing devices, for example, to distribute processing load across multiple computers, to segregate transactions based on geographic location, user access level, quality of service (QoS), etc. For example, devices 601, 605, 607, 609, and others may operate in concert to provide parallel computing features in support of the operation of control logic 625 and/or speech processing software 627.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

I claim:

1. A method comprising:
   determining a tag associated with a dataset;
   determining, by one or more computing devices, a plurality of tokenized elements by processing the tag based on one or more alphanumeric characteristics for splitting tag elements;
   determining, by the one or more computing devices, a plurality of expanded tokenized elements by processing the plurality of tokenized elements based on one or more abbreviation mappings for abbreviations that include alphabetic or numeric abbreviations;
   determining, by the one or more computing devices, a plurality of potential ontology tags by processing the plurality of expanded tokenized elements based on a plurality of tag extraction windows;
   determining one or more ontology tags by processing the plurality of potential ontology tags based on an ontology that includes a plurality of standardized dataset tags; and
   storing an association between the one or more ontology tags and the dataset.

2. The method of claim 1, wherein the dataset is formatted in one or more columns, and the tag includes a column name for a column of the one or more columns.

3. The method of claim 1, wherein the steps of claim 1 are performed based on a request to register the dataset with a metadata repository.

4. The method of claim 1, wherein the tag includes a first element, wherein the first element includes an abbreviation with alphabetic and numeric characters, and wherein the plurality of expanded tokenized elements includes a second element that is based on applying the one or more abbreviation mappings to the first element.

5. The method of claim 1, wherein the one or more alphanumeric characteristics include an occurrence of camel case or snake case.

6. The method of claim 1, wherein the one or more alphanumeric characteristics include an occurrence of a transition between an alphabetic character and a numeric character.

7. The method of claim 1, wherein the one or more alphanumeric characteristics include an occurrence of one or more of a new line character, a tab character, a comma character, or a space character.

8. The method of claim 1, wherein the one or more alphanumeric characteristics include occurrences of camel case, a transition between an alphabetic character and a numeric character, a new line character, a tab character, a comma character, and a space character.

9. The method of claim 1, wherein the plurality of tokenized elements includes a first element, wherein the first element includes an abbreviation with alphabetic or numeric characters, and wherein the plurality of expanded tokenized elements includes a second element that is based on applying the one or more abbreviation mappings to the first element.

10. The method of claim 1, wherein processing the plurality of expanded tokenized elements based on the plurality of tag extraction windows is performed by sliding each of the plurality of tag extraction windows over the plurality of expanded tokenized elements;
    wherein the plurality of tag extraction windows includes a first window that has a size of a single element; and
    wherein the plurality of tag extraction windows includes a second window that has a size equal to a number of tokenized elements in the plurality of expanded tokenized elements.

11. The method of claim 1, wherein processing the plurality of potential ontology tags based on the ontology is performed by matching one or more of the plurality of potential ontology tags with one or more of the plurality of standardized dataset tags.

12. The method of claim 1, wherein the tag includes alphanumeric elements arranged in an order; and
    wherein each the plurality of tokenized elements, the plurality of expanded tokenized elements, and the plurality of potential ontology tags maintains the order.

13. The method of claim 1, further comprising:
    receiving a request to search for a first standardized dataset tag of the plurality of standardized dataset tags;
    performing, based on the first standardized dataset tag, a search of a searchable index;
    causing, based on the search, display of an indication of the dataset;
    receiving a request for the dataset; and
    causing, based on the request for the dataset, display of the dataset.

14. One or more non-transitory media storing instructions that, when executed, cause one or more computing devices to perform steps comprising:
- determining a tag associated with a dataset;
- determining a plurality of tokenized elements by processing the tag based on one or more alphanumeric characteristics for splitting tag elements;
- determining a plurality of expanded tokenized elements by processing the plurality of tokenized elements based on one or more abbreviation mappings for abbreviations that include alphabetic or numeric abbreviations;
- determining a plurality of potential ontology tags by processing the plurality of expanded tokenized elements based on a plurality of tag extraction windows;
- determining one or more ontology tags by processing the plurality of potential ontology tags based on an ontology that includes a plurality of standardized dataset tags; and
- storing an association between the one or more ontology tags and the dataset.

15. The one or more non-transitory media of claim 14, wherein the dataset is formatted in one or more columns, and the tag includes a column name for a column of the one or more columns.

16. The one or more non-transitory media of claim 14, wherein the one or more alphanumeric characteristics include occurrences of camel case, a transition between an alphabetic character and a numeric character, a new line character, a tab character, a comma character, and a space character.

17. The one or more non-transitory media of claim 14, wherein the plurality of tokenized elements includes a first element, wherein the first element includes an abbreviation with alphabetic or numeric characters, and wherein the plurality of expanded tokenized elements includes a second element that is based on applying the one or more abbreviation mappings to the first element.

18. The one or more non-transitory media of claim 14, wherein processing the plurality of expanded tokenized elements based on the plurality of tag extraction windows is performed by sliding each of the plurality of tag extraction windows over the plurality of expanded tokenized elements;
- wherein the plurality of tag extraction windows includes a first window that has a size of a single element; and
- wherein the plurality of tag extraction windows includes a second window that has a size equal to a number of tokenized elements in the plurality of expanded tokenized elements.

19. The one or more non-transitory media of claim 14, wherein the tag includes alphanumeric elements arranged in an order; and
- wherein each of the plurality of tokenized elements, the plurality of expanded tokenized elements, and the plurality of potential ontology tags maintains the order.

20. A system comprising:
- one or more first computing devices configured to operate as part of a metadata repository; and
- one or more second computing devices that comprise:
  - one or more processors; and
  - memory storing instructions that, when executed by the one or more processors, cause the one or more second computing devices to perform steps comprising:
    - determining, based on a request to register a dataset with the metadata repository, a tag associated with the dataset;
    - determining a plurality of tokenized elements by processing the tag based on one or more alphanumeric characteristics for splitting tag elements;
    - determining a plurality of expanded tokenized elements by processing the plurality of tokenized elements based on one or more abbreviation mappings for abbreviations that include alphabetic or numeric abbreviations;
    - determining a plurality of potential ontology tags by processing the plurality of expanded tokenized elements based on a plurality of tag extraction windows;
    - determining one or more ontology tags by processing the plurality of potential ontology tags based on an ontology that includes a plurality of standardized dataset tags; and
    - storing an association between the one or more ontology tags and the dataset.

* * * * *